United States Patent [19]
Shimura

[11] Patent Number: 5,746,025
[45] Date of Patent: May 5, 1998

[54] OPERATING DEVICE FOR AN AUTOMOTIVE SLIDE DOOR

[75] Inventor: Ryoji Shimura, Yokohama, Japan

[73] Assignee: Ohi Seisakusho Co., Ltd., Yokohama, Japan

[21] Appl. No.: 603,810

[22] Filed: Feb. 20, 1996

[30] Foreign Application Priority Data

Feb. 28, 1995 [JP] Japan .................................. 7-039968
Feb. 28, 1995 [JP] Japan .................................. 7-039970

[51] Int. Cl.$^6$ ........................................ E05F 11/00
[52] U.S. Cl. ................................ 149/360; 49/362
[58] Field of Search .................... 49/360, 362, 280, 49/214, 215, 216; 296/155, 146.11, 146.12, 152

[56] References Cited

U.S. PATENT DOCUMENTS

| | | | |
|---|---|---|---|
| 4,152,872 | 5/1979 | Tanizaki et al. | 49/215 |
| 4,549,369 | 10/1985 | Foley, Jr. | 49/280 |
| 4,582,357 | 4/1986 | Nakamura et al. | 296/155 |
| 4,640,050 | 2/1987 | Yamagishi et al. | 49/280 |
| 4,662,109 | 5/1987 | Yui et al. | 49/214 |
| 4,862,011 | 8/1989 | Wright | 296/152 |
| 4,887,390 | 12/1989 | Boyko et al. | 49/280 |
| 4,932,715 | 6/1990 | Kramer | 49/215 |
| 4,984,385 | 1/1991 | DeLand | 49/360 |
| 5,025,591 | 6/1991 | DeLand et al. | 49/360 |
| 5,046,283 | 9/1991 | Compeau et al. | 49/138 |
| 5,138,795 | 8/1992 | Compeau et al. | 49/360 |

FOREIGN PATENT DOCUMENTS 38 27 359 A1  2/1990  Germany.

*Primary Examiner*—Kenneth J. Dorner
*Assistant Examiner*—Curtis Cohen
*Attorney, Agent, or Firm*—Foley & Lardner

[57] ABSTRACT

A slide door operating device for a motor vehicle comprises a guide track horizontally mounted to an outer surface of a vehicle body panel. A door carrying device is movable along the guide track and connected to a slide door. An electric power device is mounted in the vehicle and has a drive pulley. The vehicle body panel has a single opening. Two cables are joined to constitute a loop which extends from the power device, goes out to the outside of the vehicle body panel through the single opening, extends in and around the guide track and comes back to the power device through the single opening. The loop travels in one direction when the drive pulley is driven in one direction and travels in the other direction when the drive pulley is driven in the other direction. A given portion of the loop is connected to the door carrying device.

14 Claims, 16 Drawing Sheets

5,746,025

OPERATING DEVICE FOR AN AUTOMOTIVE SLIDE DOOR

BACKGROUND OF THE INVENTION

1. Field of the Invention

The present invention relates in general to powered slide doors for motor vehicles, and more particularly to operating devices for such slide doors. More specifically, the present invention is concerned with the slide door operating devices of a type including an electric motor by which the slide door is driven in an open/close direction.

2. Description of the Prior Art

Hitherto, various types of slide door operating devices have been proposed and put into practical use particularly in the field of van-type motor vehicles.

One is a type which, as is shown in U.S. Pat. Nos. 5,046,283 and 5,025,591, comprises generally a reversible electric motor mounted in the vehicle, guide tracks mounted horizontally on an outer surface of the vehicle body, a door carrying member movable along one of the guide tracks and connected to the slide door, door opening and closing cables each extending along the guide track and connected to the door carrying member and a cable drive pulley by which the two cables are drawn up and drawn out respectively with an aid of the power of the electric motor. That is, when, with aid of the motor, the cable drive pulley is rotated in one direction to draw up the door opening cable, the slide door is moved in an opening direction, while, the cable drive pulley is rotated in the other direction to draw up the door closing cable, the door is moved in a closing direction.

However, due to its inherent construction, the above-mentioned slide door operating device requires troublesome work when assembling the same on a vehicle body. That is, the work for arranging the two cables on the vehicle body and connecting these cables to the door carrying member has to be done while frequently checking the positions where the motor and cable drive pulley have to be mounted. In fact, during the assembling work, adjustment in length of the cables has to be made frequently, which is very troublesome. Furthermore, in the above-mentioned conventional device, it is necessary to provide a vehicle body panel with at least two openings through which the two cables are to pass. Usually, these openings are machined at the time when the vehicle body is assembled. However, these openings become useless and obstructive when the body is thereafter replaned to constitute a vehicle having no slide door. Furthermore, in the conventional device, the way in which the two cables are connected to the door carrying member tends to increase the longitudinal dimension of the same, which causes bulky construction of the guide track.

SUMMARY OF THE INVENTION

It is therefore an object of the present invention to provide an operating device for an automotive slide door, which is free of the above-mentioned drawbacks.

According to the present invention, there is provided a slide door operating device for use in a vehicle having a slide door which slides along a vehicle body panel between a fully closed position wherein the slide door is put or located in a door opening formed in the vehicle body panel and a fully opened position wherein the slide door is kept or located away from the door opening. The operating device comprises a guide track mounted to an outer surface of the vehicle body panel, which extends substantially horizontally; a door carrying device movable along the guide track and connected to the slide door; an electric power device mounted in the vehicle, the power device including a drive pulley; first means defining a single opening in the vehicle body panel; two cables joined to constitute a loop which extends from the power device, goes out to the outside of the vehicle body panel through the single opening, extends in and around the guide track and comes back to the power device through the single opening, the loop being moved in one direction when the drive pulley is driven in one direction and moved in the other direction when the drive pulley is driven in the other direction; and second means for connecting a given portion of the loop to said door carrying device.

According to a second aspect of the present invention, there is provided a motor vehicle which comprises a vehicle body panel having a door opening formed therein; a slide door horizontally movable along the vehicle body panel between a fully closed position wherein the slide door is neatly put or located in the door opening and a fully opened position wherein the slide door is kept or located away from the door opening; a guide track mounted to an outer surface of the vehicle body panel, which extends horizontally; a door carrying device movable along the guide track and connected to the slide door; an electric power device mounted to an inner side of the vehicle body panel; means defining a single opening in the vehicle body panel; two cables joined to constitute a loop which extends from the power device, goes out to the outside of the vehicle body panel through the single opening, extends in and around the guide track and comes back to the power device through the single opening, the loop traveling in one direction when the drive pulley is driven in one direction and traveling in the other direction when the drive pulley is driven in the other direction; and a cable connecting structure provided on the door carrying device, the cable connecting structure having a given part of the loop connected thereto.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
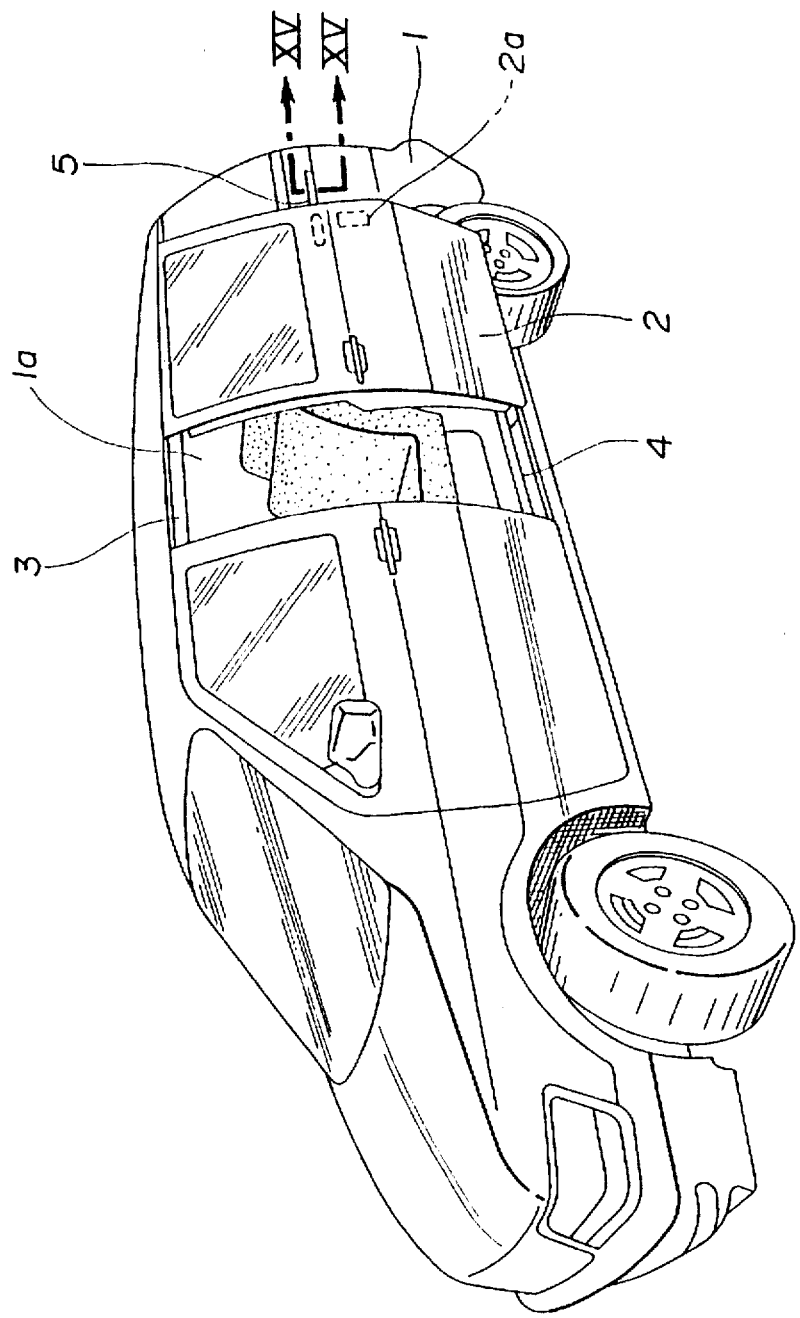
FIG. 1 is a side view of a van-type motor vehicle to which the present invention is applied.
Figure 2:
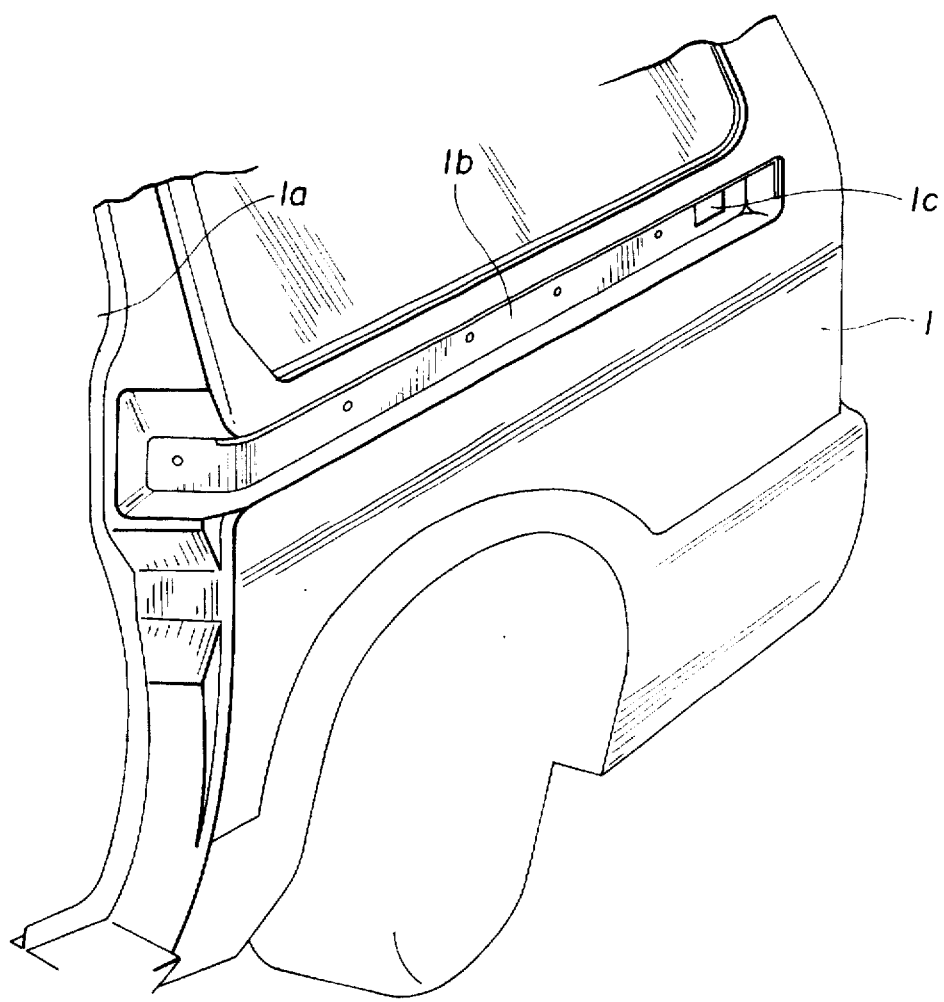
FIG. 2 is an enlarged perspective view of a rear portion of the van-type motor vehicle to which the present invention is practically applied.

In FIGS. 1 and 2, there is shown a van-type motor vehicle having a slide door to which the present invention is practically applied. The van-type motor vehicle shown comprises a vehicle body panel 1 having a door opening 1a, and a slide door 2 slidably mounted to the vehicle body panel 1 to open and close the door opening 1a.

For guiding movement of the slide door 2, a guide structure is employed, which comprises an upper guide track 3 mounted to an upper edge of the door opening 1a, a lower guide track 4 mounted to a lower edge of the door opening 1a and a middle guide track 5 mounted to a rear waist part of the vehicle body panel 1.

As is understood from FIG. 2, the rear waist part of the vehicle body panel 1 is formed with a horizontally extending groove 1b into which the middle guide track 5 is tightly mounted.

Figure 4:
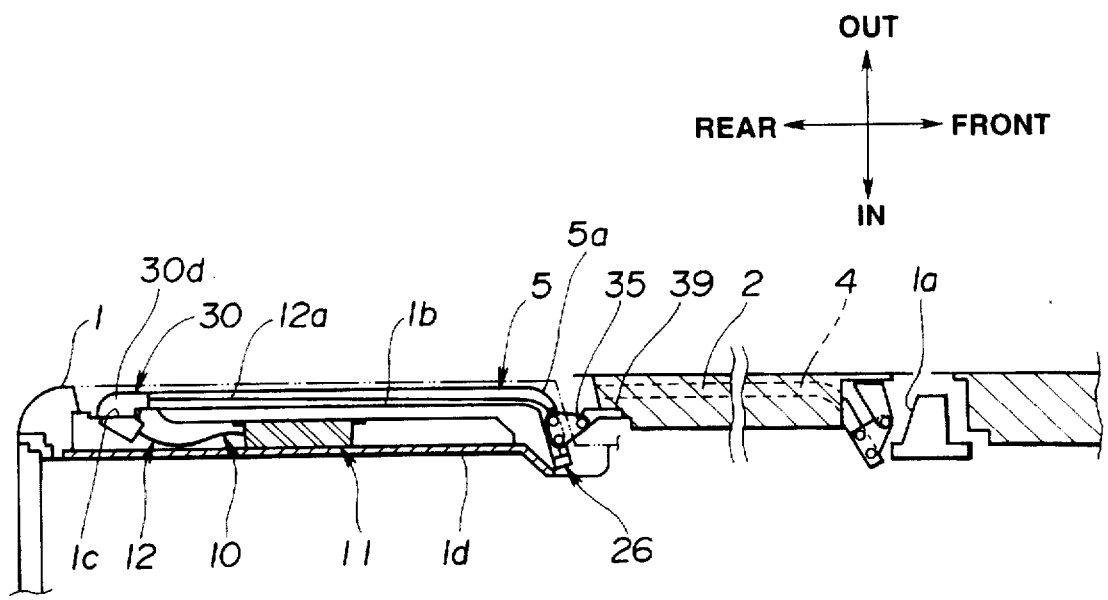
FIG. 4 is a horizontally sectioned view of the essential portion of the motor vehicle in a condition wherein a slide door is in a fully closed position.
Figure 5:
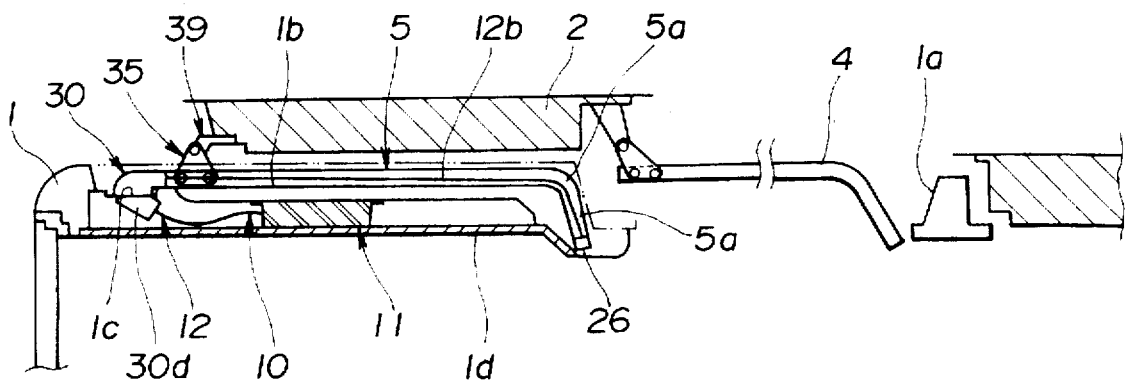
FIG. 5 is a view similar to FIG. 4, but showing a condition wherein the slide door is in a fully opened position.

The slide door 2 can slide between a fully closed position as shown in FIG. 4 wherein the slide door 2 is neatly put or located in the door opening 1a to fully close the same and a fully opened position as shown in FIG. 5 wherein the slide door 2 is kept or located away from the door opening 1a to fully open the same. Due to provision of an inwardly curved front part of the guide structure, during closing movement, the slide door 2 is gradually shifted inward toward the door opening 1a. That is, during opening movement, the slide door 2 is gradually shifted outward and moved rearward over the outer surface of the vehicle body panel 1.

When the slide door 2 comes to the fully closed position, a door lock 2a mounted on the door 2 is brought into engagement with a striker (not shown) fixed to the vehicle body panel 1 to keep it in the fully closed position of the door 2.

Figure 3:
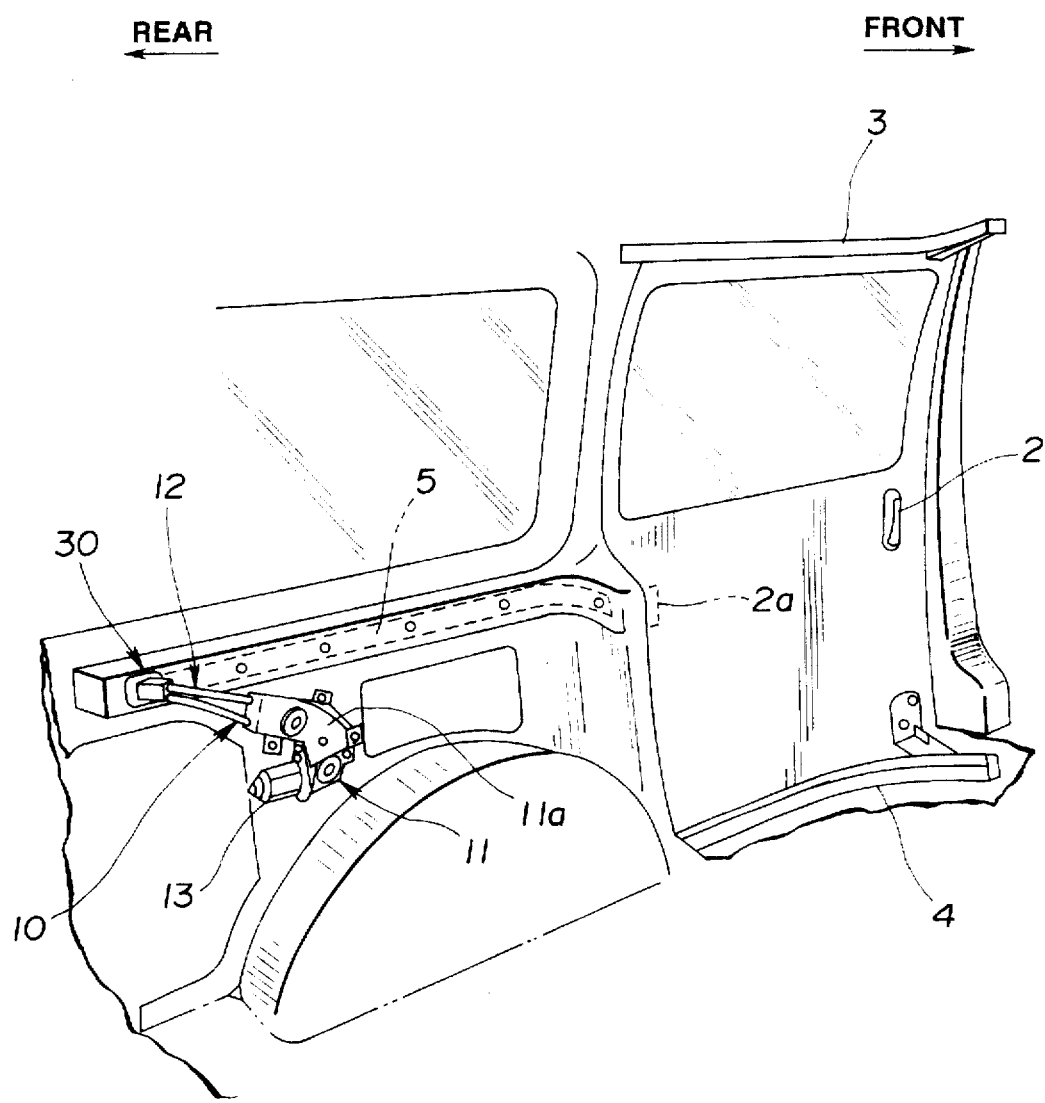
FIG. 3 is a perspective view of the rear portion of the motor vehicle, which is taken from the inside of the vehicle.

As is shown in FIG. 3, a door drive unit 10 is mounted in the vehicle body with some parts exposed to the outside. The door drive unit 10 is arranged behind the door opening 1a and has the middle guide track 5 as one part, as will become apparent from the following.

Figure 7:
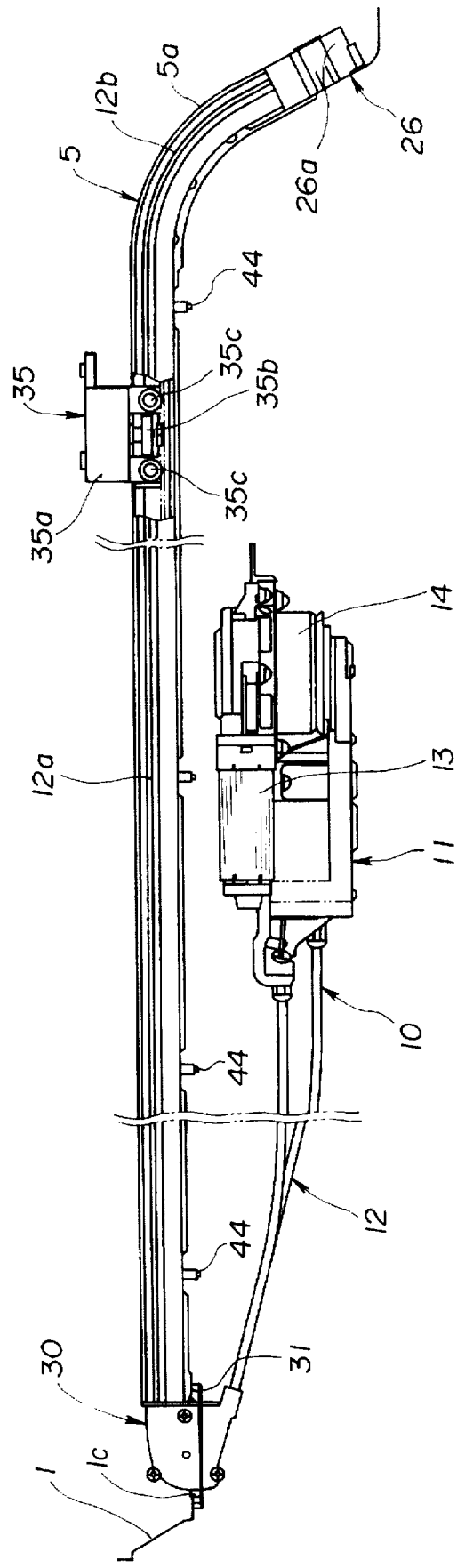
FIG. 7 is a plan view of the slide door operating device of the present invention.

As is best seen in FIG. 7, the door drive unit 10 comprises generally a power device 11, the middle guide track 5 and a cable unit 12 which are assembled to constitute a generally U-shaped structure, as shown. It is to be noted that these parts 11, 5 and 12 are assembled to constitute the door drive unit 10 before being mounted to the vehicle body panel 1.

As is seen from FIG. 4, the power device 11 is arranged between the vehicle body panel 1 and an inner panel 1d.

As has been described hereinbefore, the middle guide track 5 is received in and fixed in the horizontally extending groove 1b (see FIG. 2) formed on the vehicle body panel 1.

As is understood from FIG. 6, the cable unit 12 comprises a door opening cable 12a and a door closing cable 12b, which constitute a loop that, as will be described in detail hereinafter, extends from the power device 11, goes out to the outside through a rectangular (cable passage) opening 1c (see FIG. 2) formed in a rear end of the horizontally extending groove 1b, extends in and around the middle guide track 5 and comes back to the power device 11 through the opening 1c.

Figure 6:
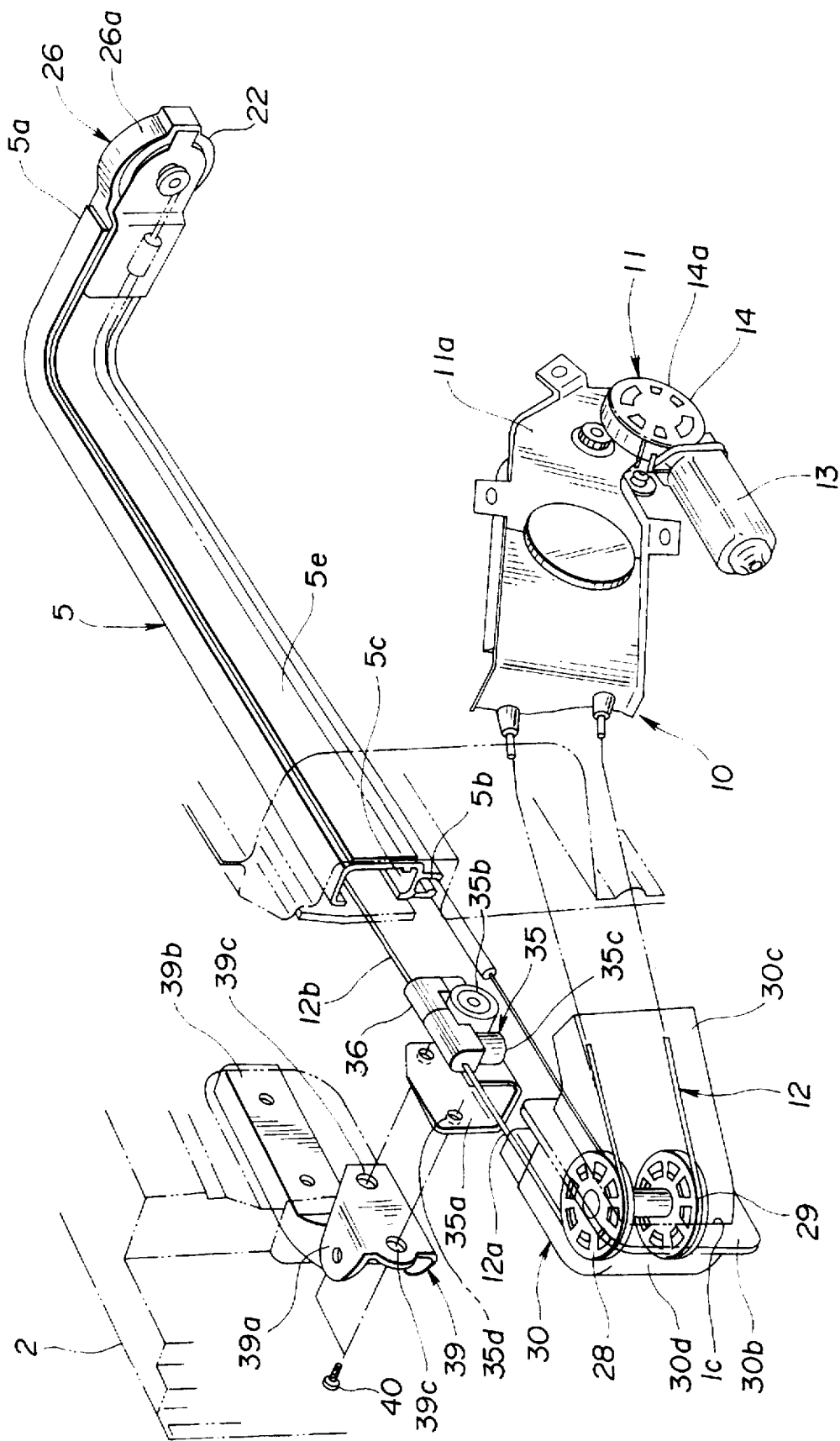
FIG. 6 is a perspective view of a slide door operating device of the present invention with some parts cut out.
Figure 8:
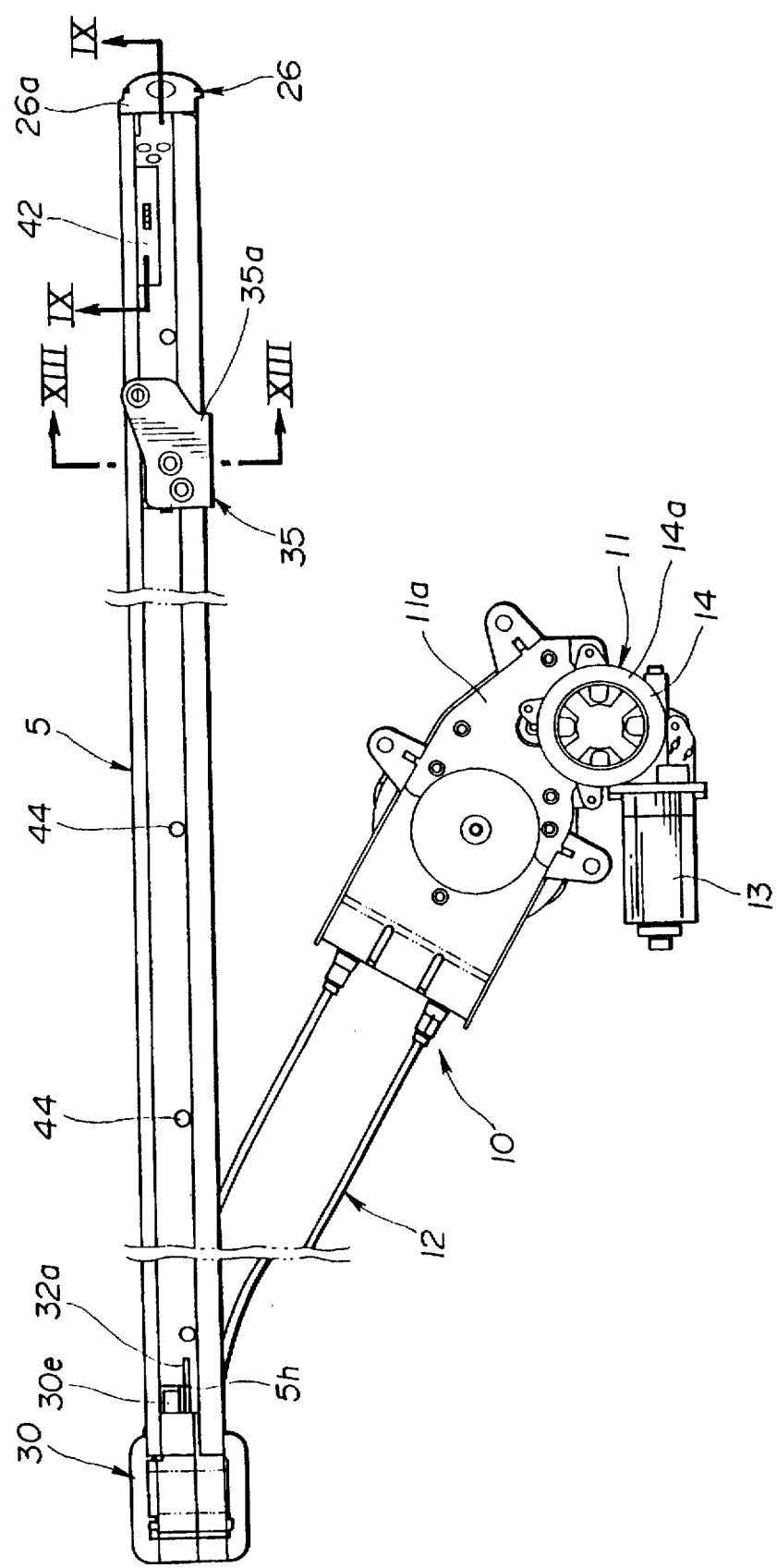
FIG. 8 is a side view of the slide door operating device of the present invention.

As is shown in FIGS. 6 to 8, the power device 11 comprises a base plate 11a bolted to the inner surface of the vehicle body panel 1, a reversible electric motor 13, a drive pulley (not shown) to which the output power of the motor 13 is transmitted, a speed reduction gear unit 14 through which the drive pulley is driven by the motor 13 at a reduced speed, and an electromagnetic clutch (not shown) installed in the gear unit 14 to selectively establish and cancel the connection between the motor 13 and the drive pulley. For controlling the electric motor 13 to run in both directions, a control switch (not shown) is mounted in the vicinity of a driver's seat.

The drive pulley installed in the gear unit 14 has the loop of the two cables 12a and 12b put thereon to drive the same in both directions with aid of the electric motor 13. The two cables 12a and 12b extend from a housing 14a of the gear unit 14, as shown.

Figure 13:
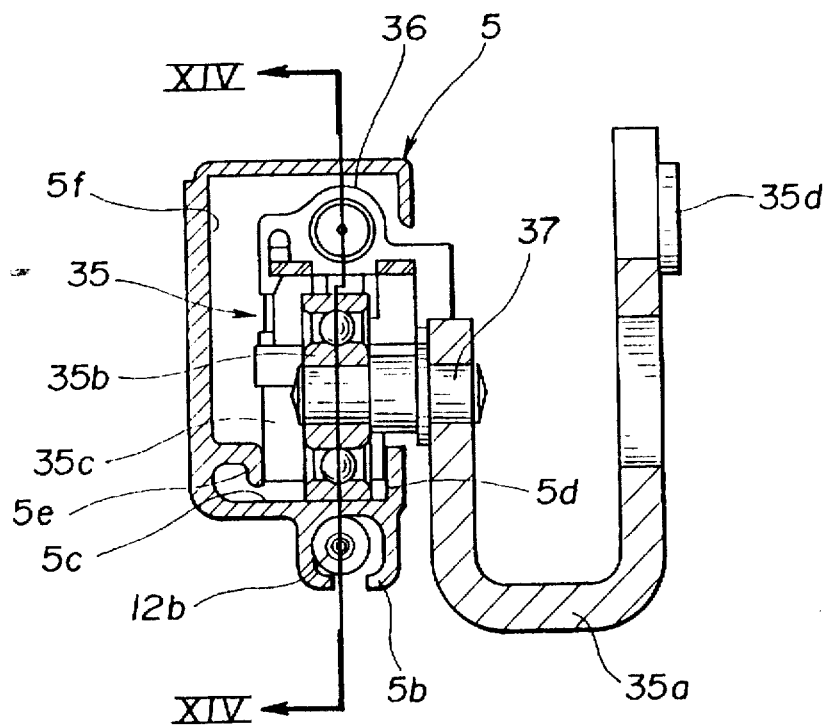
FIG. 13 is an enlarged sectional view taken along the line XIII—XIII of FIG. 8.
Figure 15:
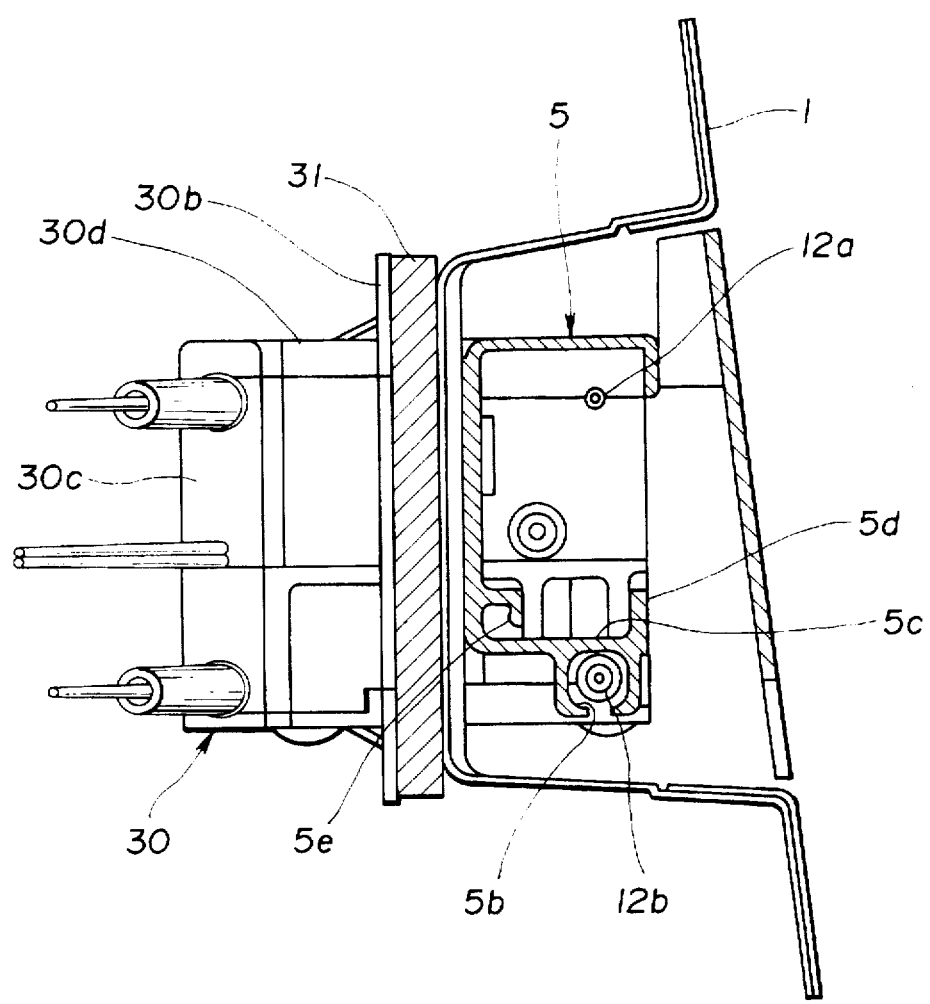
FIG. 15 is an enlarged sectional view taken along the line XV—XV of FIG. 1.

The middle guide track 5 is a drawn channel member of aluminum alloy and, as is seen from FIGS. 13 and 15, the track 5 is secured through bolts 44 (see FIG. 7) to the bottom of the horizontally extending groove 1b of the vehicle body panel 1 in such a manner that the open side thereof faces laterally outward.

As is seen from FIGS. 13 and 15, the middle guide track 5 is formed at its lower portion with two spaced side walls 5d and 5e which extend longitudinally. Beneath a bottom wall 5c of the track 5, there is longitudinally formed a cable guide groove 5b whose open side faces downward. Within the cable guide groove 5b, there is slidably received the door closing cable 12b.

As is understood from FIG. 7, the middle guide track 5 has a front part 5a curved inward, that is, toward the interior of the vehicle body. As will become apparent as the description proceeds, the curved front part 5a is used for guiding the slide door 2 to the fully closed position. The curved front part 5a has at its leading end a front guide device 26 mounted thereto.

Figure 9:
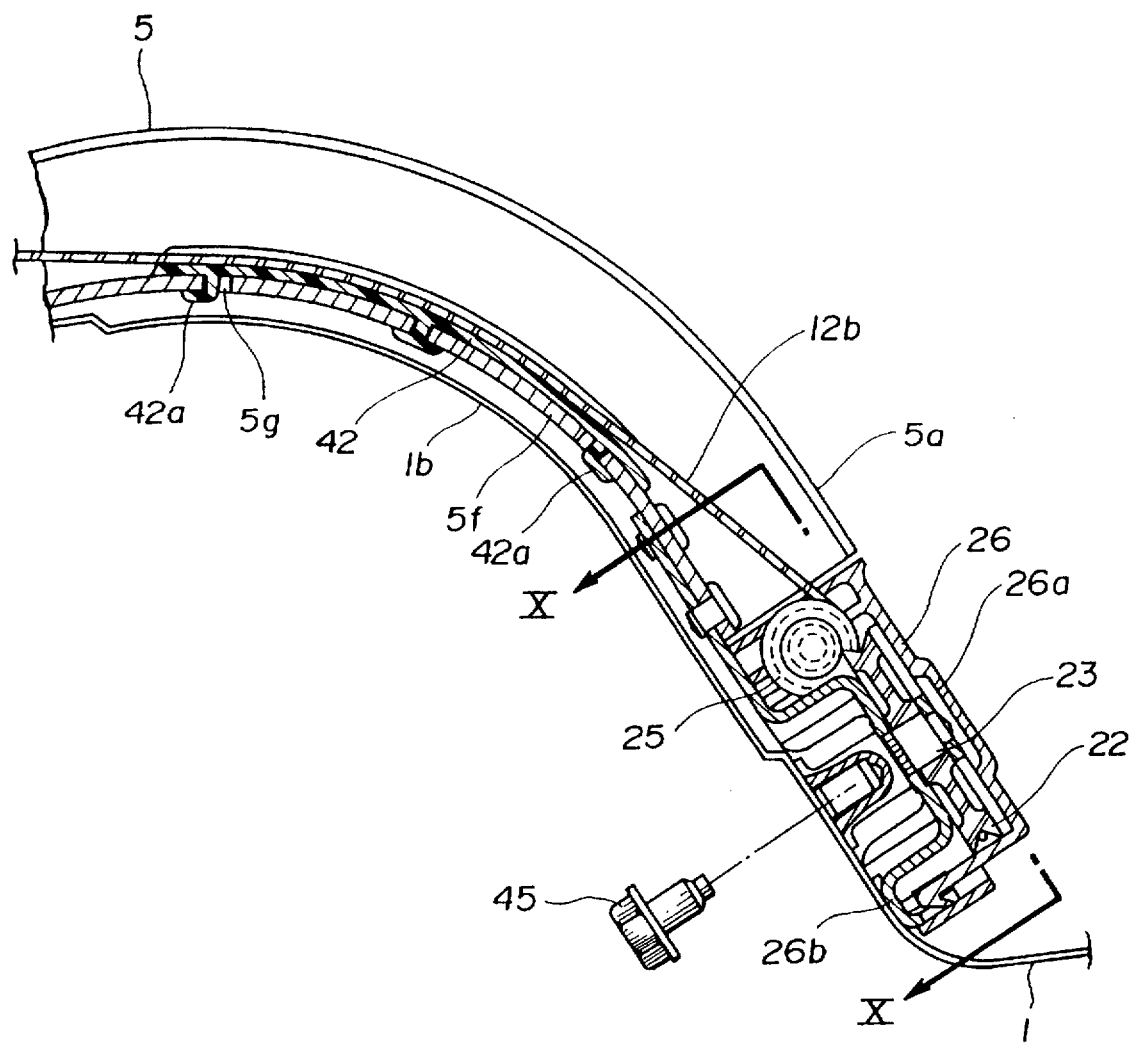
FIG. 9 is an enlarged sectional view taken along the line IX—IX of FIG. 8.
Figure 10:
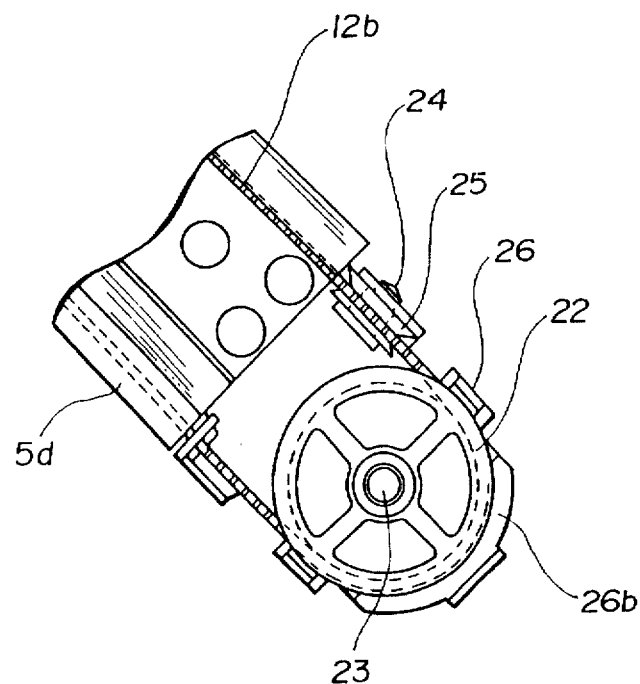
FIG. 10 is a sectional view taken along the line X—X of FIG. 9.

As is seen from FIGS. 9 and 10, the front guide device 26 comprises a base plate 26b secured to the bottom of the groove 1b through bolts 45, a horizontal shaft 23 fixed to the base plate 26b, a first front pulley 22 rotatably disposed about the shaft 23, a vertical shaft 24 fixed to the base plate 26b and a second front pulley 25 rotatably disposed about the shaft 24. That is, as is seen from FIG. 10, the door closing cable 12b extending from the cable guide groove 5b is led on the first front pulley 22 to be turned backward. The cable 12b from the pulley 22 is then put on the second front pulley 25 to be guided toward the interior of the middle guide track 5. The first and second front pulleys 22 and 25 are housed in a front housing 26a.

As is understood from FIGS. 9 and 13, an inboard base wall 5f of the curved front part 5a of the guide truck 5 has a plastic lubrication plate 42 attached thereto to which the door opening and closing cables 12a and 12b slidably contact during their traveling. Thus, the lubrication plate 42 should be constructed of a plastic having high abrasion resistance. For the connection to the inboard base wall 5f, the plastic lubrication plate 42 has a plurality of pawls 42a which are detachably engaged with openings 5g formed in the inboard base wall 5f.

As is seen from FIGS. 6, 7, 8, 11 and 12, the middle guide track 5 has at its rear part a rear guide device 30.

Figure 12:
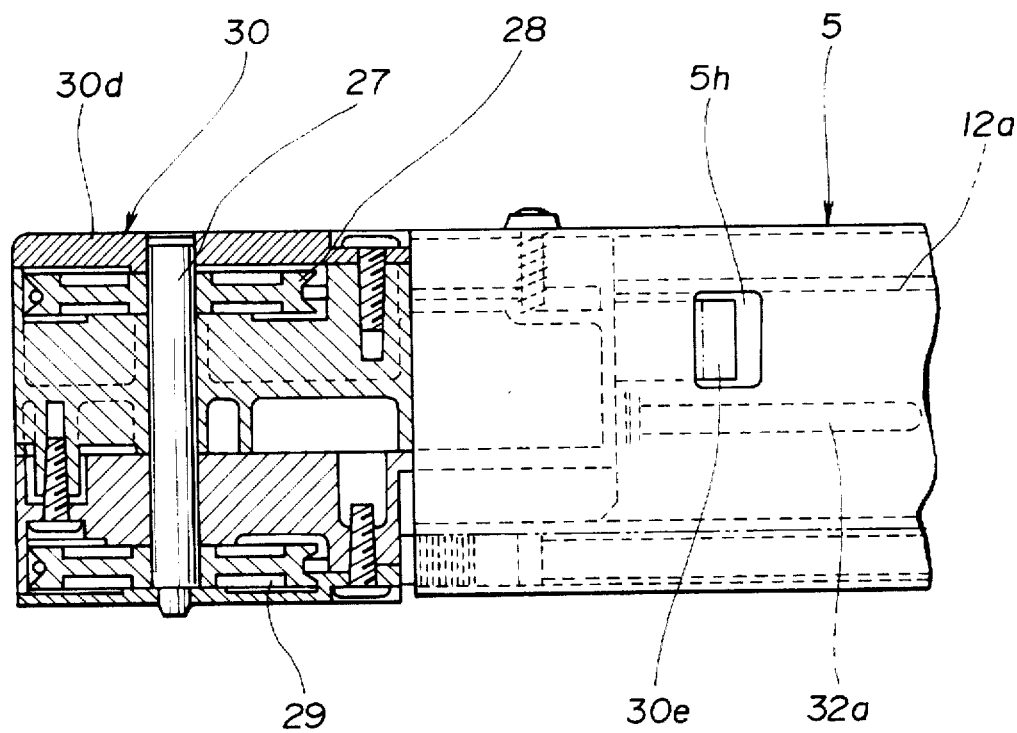
FIG. 12 is a sectional view taken along the line XII—XII of FIG. 11.

As is best seen from FIG. 12, the rear guide device 30 comprises a housing 30d, a vertical shaft 27 vertically installed in the housing 30d, and first and second rear pulleys 28 and 29 rotatably disposed about the vertical shaft 27.

Figure 11:
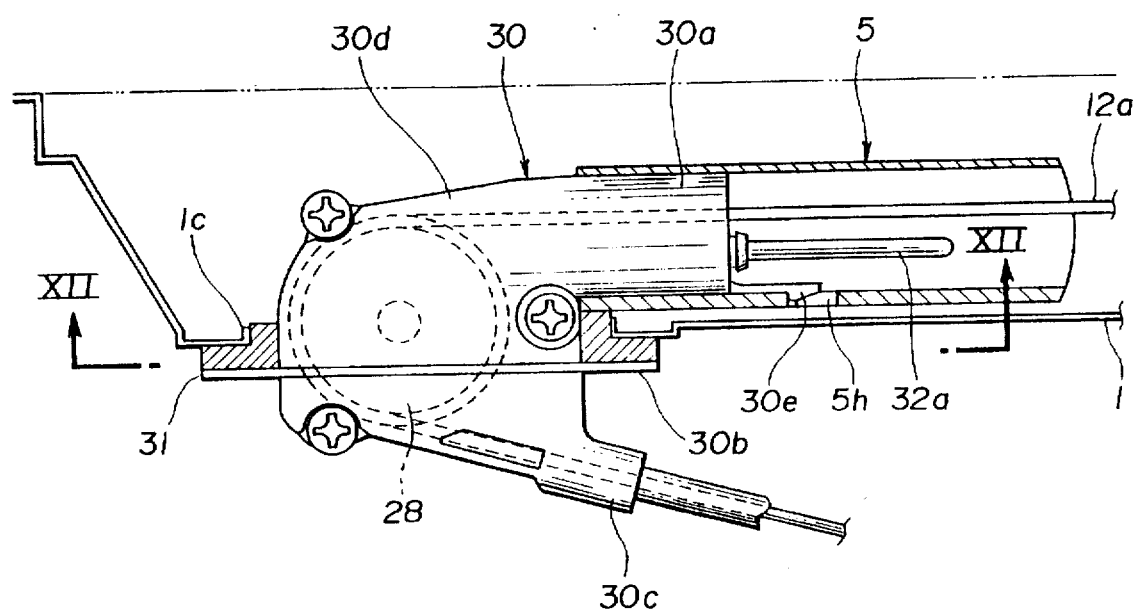
FIG. 11 is a partially sectioned enlarged plan view of a rear portion of the slide door operating device of the present invention.

As is understood from FIG. 11, the housing 30d is mated with the opening 1c of the horizontally extending groove 1b of the vehicle body panel 1. As will be described in detail hereinafter, in assembly of the door drive unit 10 to the vehicle body, the housing 30d is thrust into the opening 1c from the interior of the vehicle body and coupled with a rear end of the middle guide track 5 which has been placed in the horizontally extending groove 1b.

As is best seen in FIG. 11, the housing 30d comprises a mating portion 30a which has a latch pawl 30e, a flange portion 30b which is put on the vehicle body panel 1 from the interior of the vehicle body, and a guides portion 30c which guide the door opening and closing cables 12a and 12b extending from the power device 11. That is, upon assembly, the latch pawl 30e of the housing 30d is engaged with an opening 5h formed in the middle guide track 5. With this, the housing 30d is latched to the guide track 5.

Between the flange portion 30b of the housing 30d and a peripheral solid portion of the opening 1c, there is tightly disposed a seal member 31. With this, any water, such as rain water, can not enter the vehicle through the opening 1c.

Figure 16:
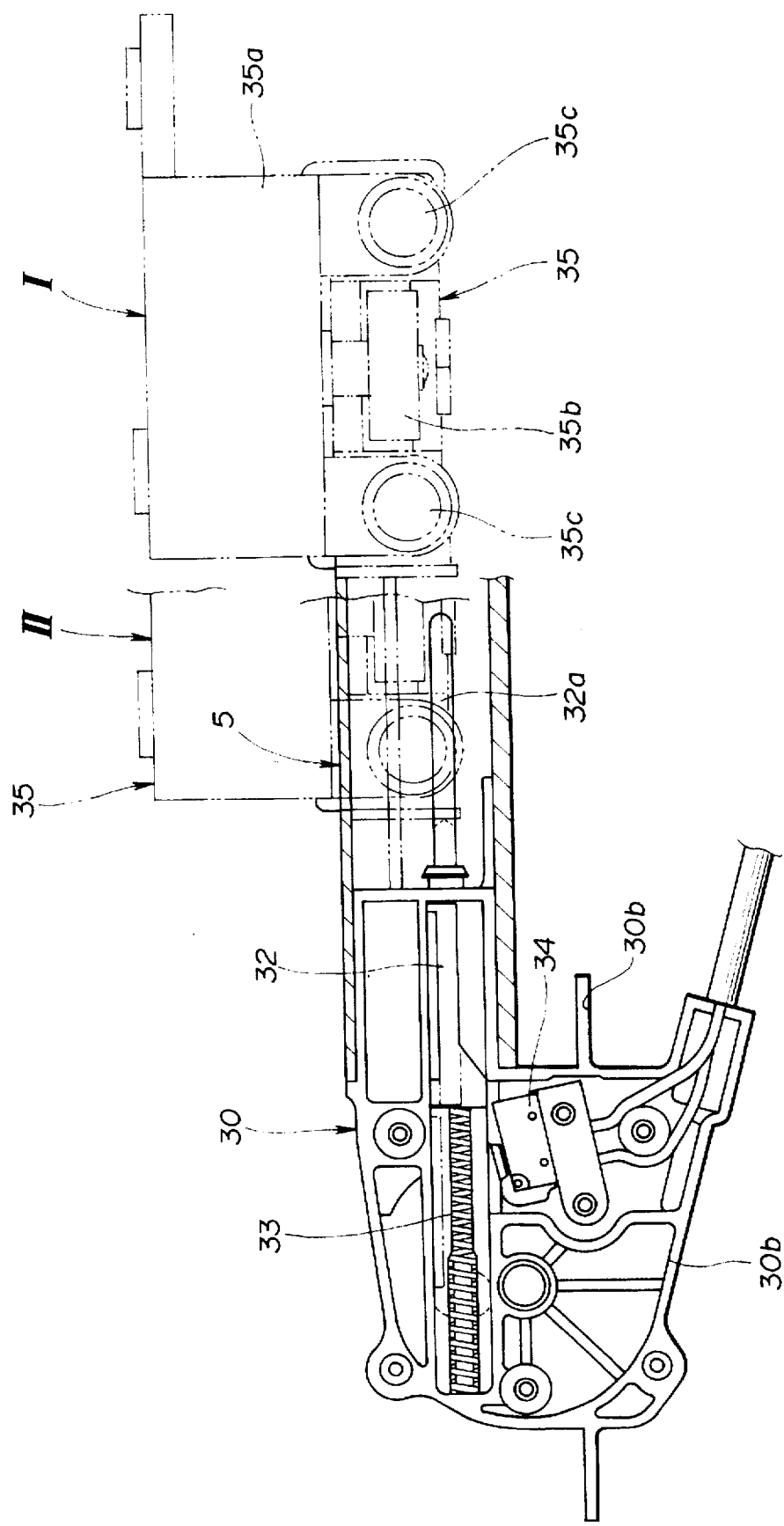
FIG. 16 is an enlarged sectional view of the rear portion of the slide door operating device of the present invention.

As is seen from FIG. 16, the housing 30d has a slider 32 and a spring 33 installed therein. The slider 32 is axially movable in the housing 30d and has a detector pin 32a connected thereto. The detector pin 32a is projectable into the middle guide track 5 in response to the sliding movement of the slider 32 in the housing 30d. The spring 33 is compressed between the slider 32 and a rear wall of the housing 30d to bias the slider 32 rightward in FIG. 16, that is, in the direction to project the detector pin 32a into the guide track 5.

Usually, the slider 32 assumes a projected position as shown by a solid line. However, when, under opening movement, the slide door 2 comes to a position just before the fully opened position, a door carrying device 35 secured to the door 2 abuts against the detector pin 32a to push the same against the spring 33, so that the slider 32 is moved back to a retracted position as shown by a phantom line. The door carrying device 35 will be described in detail hereinafter.

Designated by numeral 34 is a detector switch which can detect the fully opened condition of the slide door 2 upon sensing the slider 33 coming to the retracted position. Upon detection of the fully opened condition, a control unit (not shown) stops power feeding to both the electric motor 13 and the electromagnetic clutch of the gear unit 14, so that the slide door 2 is stopped at the fully opened position.

As is understood from FIG. 7, the door carrying device 35 is slidably guided by the middle guide track 5.

As is seen from FIG. 13, the door carrying device 35 comprises a base plate 35a having a generally U-shaped cross section. Although not shown in the drawing, the base plate 35a is connected to the slide door 2. A horizontal shaft 37 is secured to the base plate 35a to move therewith. A main guide roller 35b is rotatably disposed on the shaft 37, which runs on the bottom wall 5c of the middle guide track 5. As is seen from FIG. 14, front and rear vertical shafts 38 are held by the base plate 35a at front and rear positions of the main guide roller 35b, which have front and rear smaller guide rollers 35c rotatably disposed thereon. Each smaller guide roller 35c travels in a guide way defined by the two lower side walls 5d and 5e of the guide truck 5. A cable connecting structure 36 is provided just above the guide rollers 35b and 35c, to which the door opening cable 12a and the door closing cable 12b are connected from opposed directions, as shown.

As is understood from FIG. 6, the door opening and closing cables 12a and 12b extending from the power device 11 are introduced into the middle guide truck 5 from the rear portion of the same while being guided by the rear guide device 30 which has been put in the opening 1c of the horizontally extending groove 1b of the vehicle body panel 1.

The door opening cable 12a is guided by the first rear pulley 28 to extend in the guide truck 5 toward the front of the same. The leading end of the cable 12a is connected to the cable connecting structure 36 of the door carrying device 35.

The door closing cable 12b is guided by the second rear pulley 29 to extend in the cable guide groove 5b toward the front of the same. The cable 12b is then guided by the first front pulley 22 to extend in the guide truck 5 toward the rear of the same. The leading end of the cable 12b is connected to the cable connecting structure 36.

Figure 14:
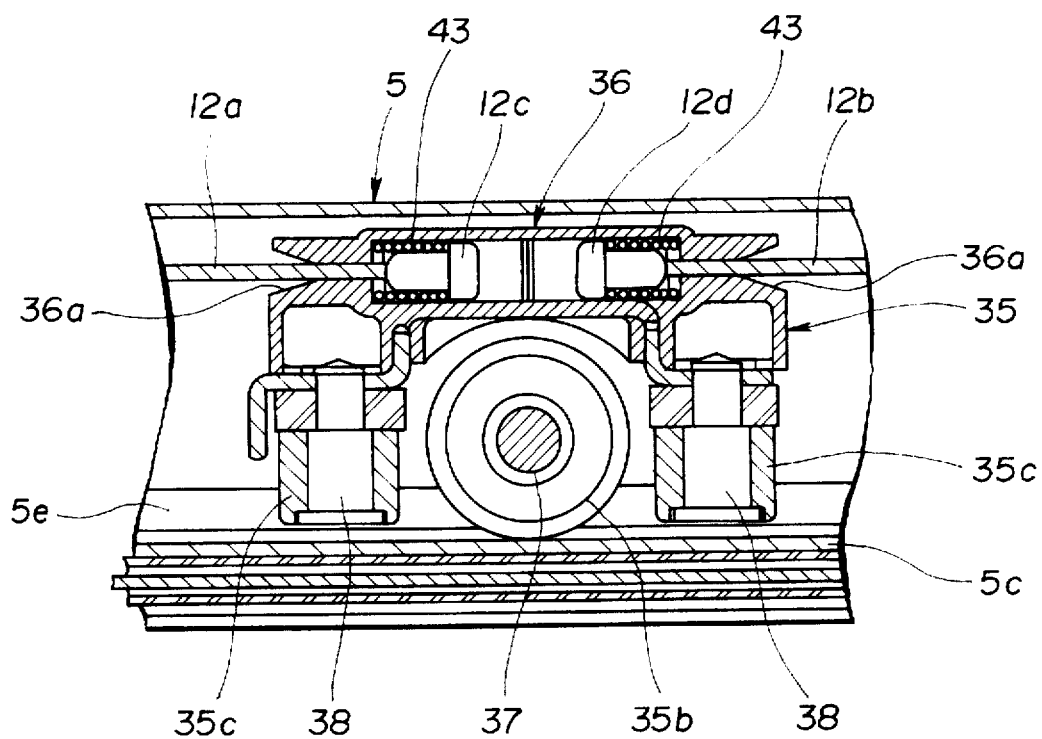
FIG. 14 is a sectional view taken along the line XIV—XIV of FIG. 13.

As is seen from FIG. 14, the door opening and closing cables 12a and 12b have respective end members 12c and 12d fixed to leading ends thereof. The two end members 12c and 12d are slidably received in a cylindrical bore defined in the cable connecting structure 36. Between each end member 12c or 12d and a stepped portion defined in the cylindrical bore, there is compressed a spring 43 by which the cable 12a or 12b is tensioned.

Figure 18:
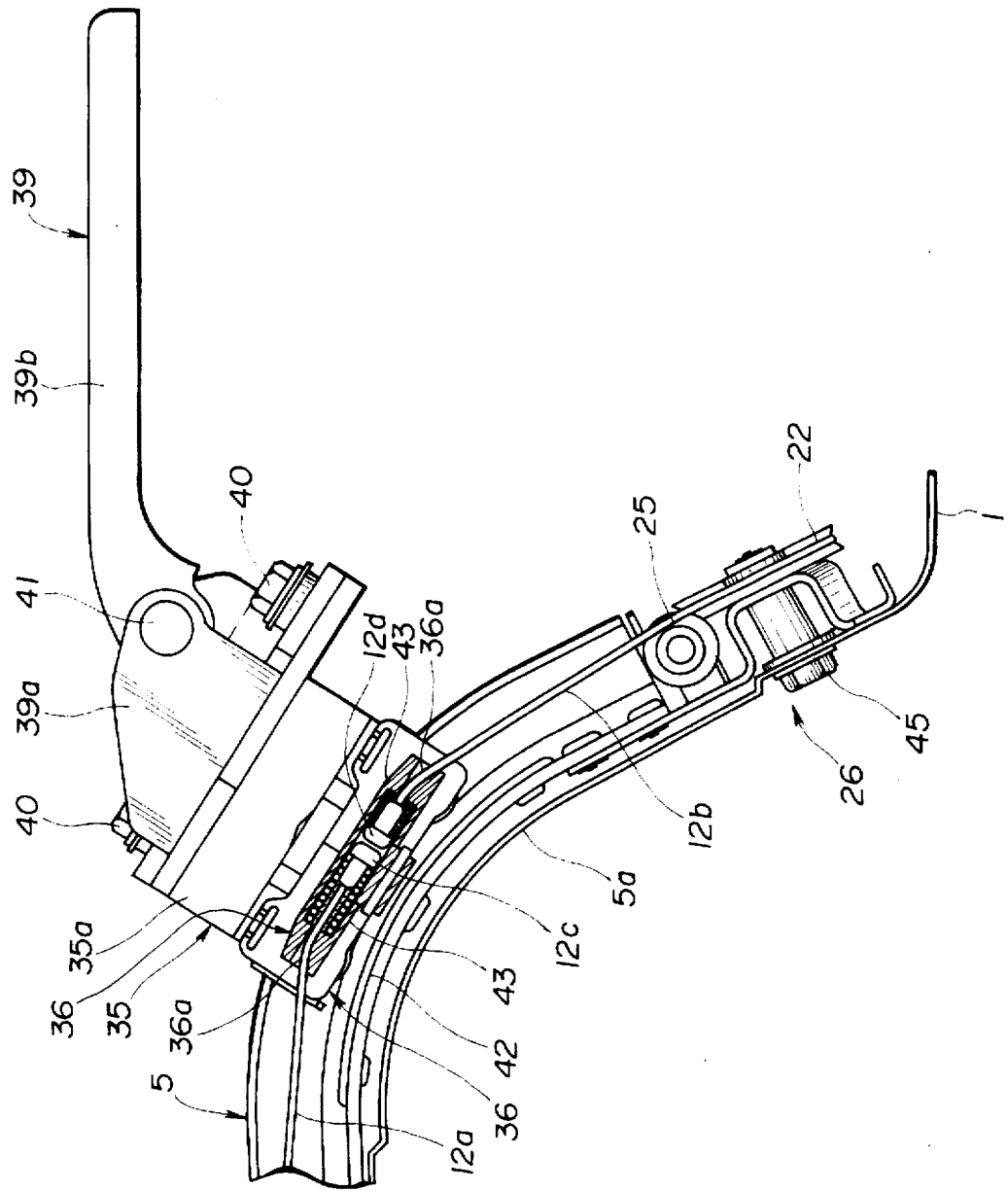
FIG. 18 is a view similar to FIG. 17, but showing a condition wherein the door carrying device is running on a front corner of a middle guide truck.

As is seen from FIG. 18, opposed end portions 36a of the cylindrical bore of the cable connecting structure 36 are tapered.

As is seen from FIG. 6, the door carrying device 35 is connected to the slide door 2 through a hinge structure 39. Thus, upon energization of the electric motor 13 of the door drive unit 10, the door carrying device 35 runs along the guide truck 5 to move the slide door 2 toward the fully closed or opened position.

Figure 17:
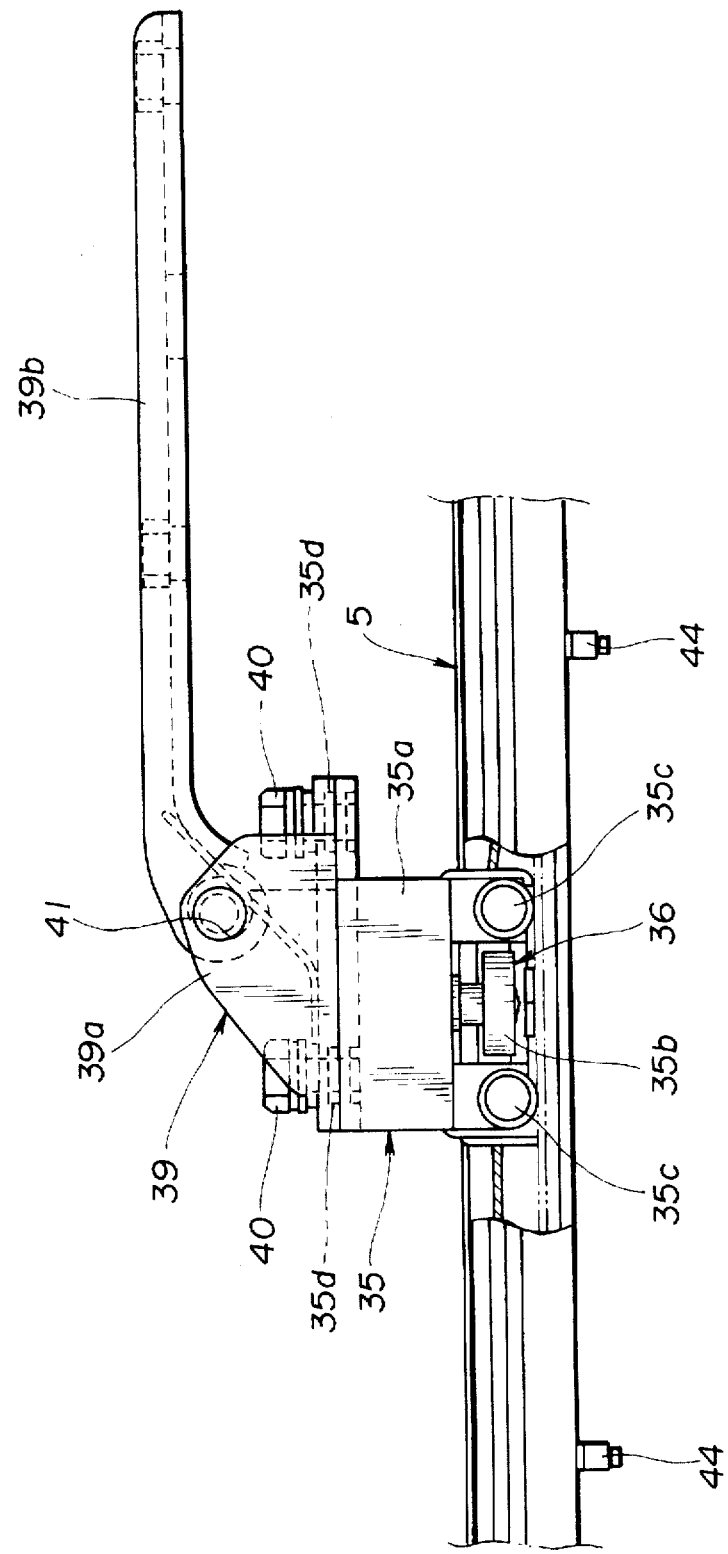
FIG. 17 is a partially cut plan view of a door carrying device and its associated parts.

As is understood from FIGS. 6, 17 and 18, the hinge structure 39 comprises a bracket 39a which is secured to the base plate 35a of the door carrying device 35 and an arm 39b which is pivotally connected to the bracket 39a through a vertical shaft 41. The arm 39b is secured to a rear portion of the slide door 2. In assembly, the bracket 39a is secured to the base plate 35a by using bolts 40 after the middle guide track 5 has been fixed in the horizontally extending groove 1b of the vehicle body panel 1. In order to obtain relative alignment upon coupling, the bracket 39a and the base plate 35a are formed with positioning openings 39c and positioning projections 35d respectively.

In the following, steps for mounting the door drive unit 10 to the vehicle body will be described.

As has been described hereinbefore, the door drive unit 10 including the power device 11, the middle guide track 5 and the cable unit 12 is preassembled before being mounted to the vehicle body panel 1. Thus, the door drive unit 10 has such an appearance as shown in FIG. 6.

Then, the middle guide track 5, from the curved front part 5a thereof, is led into the opening 1c of the vehicle body panel 1 from the inside of the vehicle body, causing the entire of guide track 5 to be exposed to the outside of the vehicle body. The guide track 5 is then secured via the bolts 44 (see FIG. 7) to the bottom of the horizontally extending groove 1b of the vehicle body panel 1, and the power device 11 is mounted to the inner side of the vehicle body panel 1 (see FIG. 4). Then, the housing 30d of the rear guide device 30 is mated with the opening 1c and coupled with the rear end of the guide track 5.

Then, the hinge structure 39 is secured via the bolts 40 to the door carrying device 35 which has been installed in the guide track 5.

Then, the hinge structure 39 is connected to the slide door 2 which has been slidably supported on the vehicle body panel 1 through the upper and lower guide tracks 3 and 4. With this, the slide door 2 becomes connected to the power device 11 through the cable unit 12.

In the following, operation will be described with reference to the drawings. For ease of understanding, the description will be commenced with respect to the fully closed position of the slide door 2 as shown in FIG. 4.

Under such condition, the slide door 2 is fully received in the door opening 1a of the vehicle body panel 1, the electric motor 13 and the electromagnetic clutch of the gear unit 14 are kept deenergized, and the door lock 2a (see FIG. 3) of the slide door 2 is fully engaged with the striker of the vehicle body.

When a control switch is actuated for the purpose of opening the slide door 2, the engagement of the door lock 2a and the striker is canceled and at the same time the electric motor 13 is energized to run in a normal direction and the electromagnetic clutch is energized to establish the connection between the motor 13 and the drive pulley of the power device 11. With this, the drive pulley is driven to draw up the door opening cable 12a and draw out the door closing cable 12b causing the door carrying device 35 to move in the guide track 5 in the door opening direction.

When the slide door 2 comes to a position just before the fully open position, the door carrying device 35 pushes the detector pin 32a of the slider 32 causing the detector switch 34 to detect the fully opened condition of the slide door 2. Upon this, the power feeding to the electric motor 13 and the electromagnetic clutch of the gear unit 14 is stopped, and thus the slide door 2 is stopped at the fully opened position.

When the control switch is actuated for the purpose of closing the slide door 2, the electric motor 13 is energized to run in a reversed direction and at the same time the electromagnetic clutch is energized to establish the connection between the motor 13 and the drive pulley. With this, the drive pulley is driven to draw up the door closing cable 12b and draw out the door opening cable 12a causing the door carrying device 35 to move in the door closing direction. That is, during this, the door closing cable 12b pulls the door carrying device 35 rightward in FIG. 6.

When, as is seen from FIG. 18, the door carrying device 35 comes to the curved front part 5a of the guide track 5, the door opening cable 12a and the door closing cable 12b are bent smoothly in the tapered opposed end portions 36a of the cylindrical bore of the cable connecting structure 36, as shown. Such smooth bending suppresses or at least minimizes breakage of the cables 12a and 12b.

If, as is seen from FIG. 18, the door opening cable 12a, which is drawn out from the drive pulley of the power device 11, shows a slack, the associated spring 43 urges the associated end member 12c to move toward the other end member 12d. With this, the slack of the door opening cable 12a disappears. Such slack removing action takes place also in the door closing cable 12b in the case wherein the door closing cable 12b is drawn out form the drive pulley during the door opening movement of the door carrying device 35.

When the slide door 2 comes to the fully closed position, the door lock 2a is brought into engagement with the striker and a full close detecting switch (not shown) is actuated to stop the power feeding to the electric motor 13 and the electromagnetic clutch. With this, the slide door 2 is stopped at the fully closed position.

In the present invention, the following advantages are given.

First, the door drive unit 10 including the power device 11, the middle guide track 5 and the cable unit 12 can be preassembled before being mounted to the vehicle body. Thus, the door drive unit 10 can be mounted to the vehicle body easily and accurately.

Second, only one small opening 1c is needed for arranging the middle guide track 5 onto the outer side of the vehicle body. Considering the two openings needed in case of the aforementioned prior art slide door operating device, provision of only one small opening 1c brings about an easier interchangeability of the vehicle body panel 1 with another body panel designed for a vehicle having no slide door.

Third, the cable connecting structure 36 is provided by effectively using an upper part of the door carrying device 35, which makes the longitudinal dimension of the device 35 small. Thus, the length of the middle guide track 5 can be reduced by a corresponding degree.

Fourth, due to provision of the springs 43 in the cylindrical bore of the cable connecting structure 36, undesired slack which would occur in the cables 12a and 12b during their traveling can be removed.

What is claimed is:

1. A motor vehicle comprising:
    a vehicle body panel having a door opening and a cable passage opening formed therein;
    a slide door horizontally movable along said vehicle body panel between a fully closed position, where the slide door occupies said door opening and a fully opened position, where the slide door is located away from said door opening;
    a horizontally extending guide track mounted to an outer surface of said vehicle body panel;
    a door carrying device movable along said guide track and connected to said slide door;
    an electric power device mounted to an inner side of said vehicle body panel;
    two cables joined to constitute a loop that extends from said power device, extends out to the outside of the vehicle body panel through said cable passage opening, extends in and around said guide track, which extends outside the vehicle and returns to said power device through the same cable passage opening, said loop traveling in one direction when said drive pulley is driven in said one direction and traveling in another direction when said drive pulley is driven in said another direction; and
    a cable connecting structure provided on said door carrying device, said cable connecting structure having a given part of said loop connected thereto.

2. A vehicle comprising:
    a vehicle body panel having a door opening and a cable passage opening;
    a slide door slideable along the vehicle body panel between a fully closed position, where the slide door is located in said door opening and a fully opened position, where the slide door is located away from said door opening;

a guide track, with a portion thereof extending substantially horizontally, mounted to an outer surface of said vehicle body panel;

a door carrying device movable along said guide track and connected to said slide door;

an electric power device mounted in said vehicle, said power device including a drive pulley;

two cables joined to constitute a loop that extends from said power device, extends out to the outside of the vehicle body panel through said cable passage opening, extends in and around said guide track, which extends outside the vehicle, and returns to said power device through the same cable passage opening, said loop traveling in one direction when said drive pulley is driven in said one direction and traveling in another direction when said drive pulley is driven in said another direction; and means for connecting a given portion of said loop to said door carrying device.

3. A vehicle as claimed in claim 2, wherein said cable passage opening is so sized and shaped as to permit passing of said guide track therethrough from the inside to the outside the vehicle.

4. A vehicle as claimed in claim 3, wherein said cable passage opening is located through a rear end of said guide track.

5. A vehicle as claimed in claim 2, wherein said guide track has a generally c-shaped cross section with an open side facing laterally outward.

6. A vehicle as claimed in claim 5, further including a cable guide groove, through which said loon passes, positioned at a lower portion of said guide track.

7. A vehicle as claimed in claim 6, further comprising a front guide device mounted to a front end of said guide track, said front guide device guiding said loop toward the interior of said guide track.

8. A vehicle as claimed in claim 2, in which said door carrying device comprises:

a base plate, a main guide roller rotatably connected to said base plate through a horizontal shaft, said main guide roller running on a bottom wall of said guide track, and front and rear guide rollers, smaller than said main guide roller, rotatably connected to said base plate through respective horizontal shafts, the main guide roller being positioned between said front and rear guide rollers, which run in a guideway defined by two lower side walls of said guide track.

9. A vehicle as claimed in claim 8, wherein said connecting means comprises a cable connecting structure integrally mounted on said door carrying device at a position above said main, front and rear guide rollers.

10. A vehicle as claimed in claim 9, wherein respective ends of said two cables are connected to said cable connecting structure from opposed directions.

11. A vehicle as claimed in claim 10, wherein said cable connecting structure comprises means defining a cylindrical bore; two end members fixed to the ends of said two cables, said two end members being slidably received in said cylindrical bore in a manner to face each other; and biasing means for biasing said two end members toward each other.

12. A vehicle as claimed in claim 11, wherein said cylindrical bore has stepped portions and said biasing means comprises two springs each being compressed between one of said end members and one of said stepped portions.

13. A vehicle as claimed in claim 11, wherein said cylindrical bore of said cable connecting structure has tapered axial ends.

14. A vehicle as claimed in claim 2, wherein said vehicle body panel has a substantially horizontally extending groove provided at the outer surface thereof, said guide track being received in said groove, and said cable passage opening is formed in a rear end of said groove.

* * * * *